US012793557B2

(12) United States Patent
Costas et al.

(10) Patent No.: US 12,793,557 B2

(45) **Date of Patent: *Nov. 10, 2026**

(54) DYNAMIC SELECTION OF AN AERONAUTICAL DATA PROVIDER

(71) Applicant: The Boeing Company, Arlington, VA (US)

(72) Inventors: Pablo Costas, Majadahonda (ES); Javier Lopez Leones, Majadahonda (ES); Alejandro Guemes Jimenez, Getafe (ES)

(73) Assignee: The Boeing Company, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/041,297

(22) Filed: Jan. 30, 2025

(65) Prior Publication Data

US 2025/0174133 A1 May 29, 2025

Related U.S. Application Data

(63) Continuation of application No. 17/679,853, filed on Feb. 24, 2022, now Pat. No. 12,236,791.

(51) Int. Cl.

*G08G 5/22* (2025.01)
*G06F 18/214* (2023.01)

(Continued)

(52) U.S. Cl.

CPC ............ *G08G 5/22* (2025.01); *G06F 18/214* (2023.01); *G06N 20/00* (2019.01); *G08G 5/56* (2025.01)

(58) Field of Classification Search

CPC .............. G08G 5/22; G08G 5/56; G08G 5/55; G08G 5/34; G08G 5/00; G06N 20/00; G06F 18/214

(Continued)

(56) References Cited

U.S. PATENT DOCUMENTS

| | | | | |
|---|---|---|---|---|
| 10,467,911 | B2 * | 11/2019 | Kneuper | G08G 5/76 |
| 2002/0155833 | A1 * | 10/2002 | Borel | H04B 7/18506 455/431 |
| 2019/0320383 | A1 * | 10/2019 | Gardner | G08G 5/20 |
| 2021/0027640 | A1 * | 1/2021 | Meringer | G08G 5/00 |
| 2021/0159971 | A1 * | 5/2021 | Panchal | G05D 1/101 |

(Continued)

OTHER PUBLICATIONS

Dennis et al., "Selecting Among Dual Frequency Multiple Constellation (DFMC) Satellite-Based Augmentation Systems (SBAS) During En-route and Non-Precision Flight Operations" Spring 2016, pp. 65-83, vol. 1, No. 1. (Year: 2016).*

(Continued)

*Primary Examiner* — Hitesh Patel
*Assistant Examiner* — John D Holman
(74) *Attorney, Agent, or Firm* — Massey Bean & Lewis

(57) ABSTRACT

Apparatuses, methods, systems, and program products are disclosed for dynamic selection of an aeronautical data provider. An apparatus includes a processor and a memory that stores code executable by the processor to receive a first stream of real-time aeronautical data from a first aeronautical data provider, receive at least one second stream of real-time aeronautical data from at least one second aeronautical data provider simultaneously with the first stream, provide data from the first stream and the at least one second stream to a decision model for predicting which data has a higher accuracy, and switch using data from the first stream to data from one of the at least one second streams in response to the one of the at least one second streams having a higher predicted accuracy than the first stream.

20 Claims, 6 Drawing Sheets

(51) Int. Cl.
*G06N 20/00* (2019.01)
*G08G 5/56* (2025.01)

(58) Field of Classification Search
USPC .............................................................. 701/3
See application file for complete search history.

(56) References Cited

U.S. PATENT DOCUMENTS

| | | | | |
|---|---|---|---|---|
| 2022/0011426 | A1* | 1/2022 | Gallagher .......... | H04B 7/18584 |
| 2022/0015101 | A1 | 1/2022 | Gallagher | |

OTHER PUBLICATIONS

International Civil Aviation Organization, Manual on System Wide Information Management (SWIM) Concept, Document 10039, https://www.icao.int/airnavigation/IMP/Documents/SWIM%20Concept%20V2%20Draft%20with%20DISCLAIMER.pdf, accessed Feb. 24, 2022.
https://www.eurocontrol.int/service/network-manager-business-business-b2b-web-services, screenshot accessed Feb. 24, 2022.
https://www.faa.gov/air_traffic/technology/swim/, screenshot accessed Feb. 24, 2022.
EP Search Report for European Patent Application No. 23151763.2 dated Jul. 17, 2023.
Dennis et al., Selecting Among Dual Frequency Multiple Constellation (DFMC) Satellite-Based Augmentation Systems (SBAS) During En-route and Non-Precision Flight Operations, Journal of the Institute of Navigation, Spring 2016, pp. 65-83, vol. 63, No. 1, Printed int he U.S.A.

* cited by examiner

DYNAMIC SELECTION OF AN AERONAUTICAL DATA PROVIDER

FIELD

This invention relates to flight management and more particularly relates to dynamic selection of an aeronautical data provider.

BACKGROUND

When sharing aeronautical information, different data providers offer data in their own structure, where the quality of the information and the geographical distribution varies from one to another. Different data environments may only establish a procedure to share information but may not impose any requirement on the information quality. Subsequently, each provider offers different varieties of information with different levels of quality.

In addition, these providers often provide model-based predictions that can vary substantially from one to another. Considering that most aeronautical information providers do not offer coverage for the entire airspace on Earth, the differences in the type and quality of information between different providers make it difficult to integrate this information cleanly into devices and applications.

SUMMARY

The subject matter of the present application provides examples of dynamic selection of an aeronautical data provider that overcome the above-discussed shortcomings of prior art techniques. The subject matter of the present application has been developed in response to the present state of the art, and in particular, in response to shortcomings of conventional systems.

Disclosed herein is an apparatus for dynamic selection of an aeronautical data provider. The apparatus includes a processor and a memory that stores code executable by the processor to receive a first stream of real-time aeronautical data from a first aeronautical data provider for use by a flight management system during a flight, receive at least one second stream of real-time aeronautical data from at least one second aeronautical data provider simultaneously with the first stream of aeronautical data during the flight, provide data from the first stream and the at least one second stream of real-time aeronautical data to a decision model for predicting which data of the first stream and the at least one second stream of real-time aeronautical data has a higher accuracy, and switch, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data. The preceding subject matter of this paragraph characterizes example 1 of the present disclosure.

The code is executable by the processor to generate the decision model based on historical aeronautical data. The preceding subject matter of this paragraph characterizes example 2 of the present disclosure, wherein example 2 also includes the subject matter according to example 1, above.

The generated decision model comprises a machine learning model that is trained on the historical aeronautical data. The preceding subject matter of this paragraph characterizes example 3 of the present disclosure, wherein example 3 also includes the subject matter according to example 2, above.

The generated decision model is trained to solve a minimization problem for at least one target variable that is selected for a particular application. The preceding subject matter of this paragraph characterizes example 4 of the present disclosure, wherein example 4 also includes the subject matter according to example 3, above.

The target variable comprises one or more of a message latency and an update frequency. The preceding subject matter of this paragraph characterizes example 5 of the present disclosure, wherein example 5 also includes the subject matter according to example 4, above.

The code is executable by the processor to further train the decision model based using the received first stream and at least one second stream of real-time aeronautical data. The preceding subject matter of this paragraph characterizes example 6 of the present disclosure, wherein example 6 also includes the subject matter according to example 3, above.

The code is executable by the processor to associate a scaling parameter with the first stream and at least one second stream of real-time aeronautical data, the scaling parameter comprising a weighting value that the decision model uses to determine an impact of the real-time aeronautical data on the accuracy prediction of the first stream and at least one second stream of real-time aeronautical data. The preceding subject matter of this paragraph characterizes example 7 of the present disclosure, wherein example 7 also includes the subject matter according to example 6, above.

The code is executable by the processor to normalize each of the streams of aeronautical data from the first aeronautical data provider and the at least one second aeronautical data provider prior to providing it to the decision model. The preceding subject matter of this paragraph characterizes example 8 of the present disclosure, wherein example 8 also includes the subject matter according to any of examples 1-7, above.

The code is executable by the processor to detect errors in the first stream and the at least one second stream of real-time aeronautical data based on a comparison of the accuracy predictions for the first stream and the at least one second stream of real-time aeronautical data. The preceding subject matter of this paragraph characterizes example 9 of the present disclosure, wherein example 9 also includes the subject matter according to any of examples 1-8, above.

The code is executable by the processor to determine a geographic location of the flight where the switch from the using data from the first stream of real-time aeronautical data to data from one of the at least one second streams of real-time aeronautical data occurs, the geographic location comprising another variable used by the decision model for predicting when to switch from the first stream of real-time aeronautical data to the at least one second streams of real-time aeronautical data. The preceding subject matter of this paragraph characterizes example 10 of the present disclosure, wherein example 10 also includes the subject matter according to any of examples 1-9, above.

The first and second aeronautical data providers comprise ground-based stations that provide streams of aeronautical data for a plurality of flights, the received streams comprising streams of overlapping aeronautical data from different ground-based stations. The preceding subject matter of this paragraph characterizes example 11 of the present disclosure, wherein example 11 also includes the subject matter according to any of examples 1-10, above.

Further disclosed herein is a method for dynamic selection of an aeronautical data provider. The method includes receiving a first stream of real-time aeronautical data from a first aeronautical data provider for use by a flight management system during a flight, receiving at least one second stream of real-time aeronautical data from at least one second aeronautical data provider simultaneously with the first stream of aeronautical data during the flight, providing data from the first stream and the at least one second stream of real-time aeronautical data to a decision model for predicting which data of the first stream and the at least one second stream of real-time aeronautical data has a higher accuracy, and switching, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data. The preceding subject matter of this paragraph characterizes example 12 of the present disclosure.

The method further includes generating the decision model based on the historical aeronautical data, the generated decision model comprising a machine learning model that is trained on the historical aeronautical data. The preceding subject matter of this paragraph characterizes example 13 of the present disclosure, wherein example 13 also includes the subject matter according to example 12, above.

The generated decision model is trained to solve a minimization problem for a target variable that is selected for a particular application, the target variable comprising one or more of a message latency and an update frequency. The preceding subject matter of this paragraph characterizes example 14 of the present disclosure, wherein example 14 also includes the subject matter according to example 13, above.

The method further includes training the decision model using the received first stream and at least one second stream of real-time aeronautical data. The preceding subject matter of this paragraph characterizes example 15 of the present disclosure, wherein example 15 also includes the subject matter according to example 13, above.

The method further includes associating a scaling parameter with the first stream and at least one second stream of real-time aeronautical data, the scaling parameter comprising a weighting value that the decision model uses to determine impact of the real-time aeronautical data on the accuracy prediction of the first stream and at least one second stream of real-time aeronautical data. The preceding subject matter of this paragraph characterizes example 16 of the present disclosure, wherein example 16 also includes the subject matter according to example 15, above.

The method further includes normalizing each of the streams of aeronautical data from the first aeronautical data provider and the at least one second aeronautical data provider prior to providing it to the decision model. The preceding subject matter of this paragraph characterizes example 17 of the present disclosure, wherein example 17 also includes the subject matter according to any of examples 12-16, above.

The method further includes detecting errors in the first stream and the at least one second stream of real-time aeronautical data based on a comparison of the accuracy predictions for between the first stream and the at least one second stream of real-time aeronautical data. The preceding subject matter of this paragraph characterizes example 18 of the present disclosure, wherein example 18 also includes the subject matter according to any of examples 12-17, above.

The method further includes determining a geographic location of the flight where the switch from the using data from the first stream of real-time aeronautical data to data from one of the at least one second streams of real-time aeronautical data occurs, the geographic location comprising another variable used by the decision model for predicting when to switch from the first stream of real-time aeronautical data to the at least one second streams of real-time aeronautical data. The preceding subject matter of this paragraph characterizes example 19 of the present disclosure, wherein example 19 also includes the subject matter according to any of examples 12-18, above.

Further disclosed herein is a system for dynamic selection of an aeronautical data provider that includes a plurality of ground-based stations each streaming aeronautical data from different geographic locations and a flight management system comprising a processor and a memory that stores code executable by the processor to receive a first stream of real-time aeronautical data from a first aeronautical data provider for use by the flight management system during a flight, receive at least one second stream of real-time aeronautical data from at least one second aeronautical data provider simultaneously with the first stream of aeronautical data during the flight, provide data from the first stream and the at least one second stream of real-time aeronautical data to a decision model for predicting which data of the first stream and the at least one second stream of real-time aeronautical data has a higher accuracy, and switch, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data. The preceding subject matter of this paragraph characterizes example 20 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
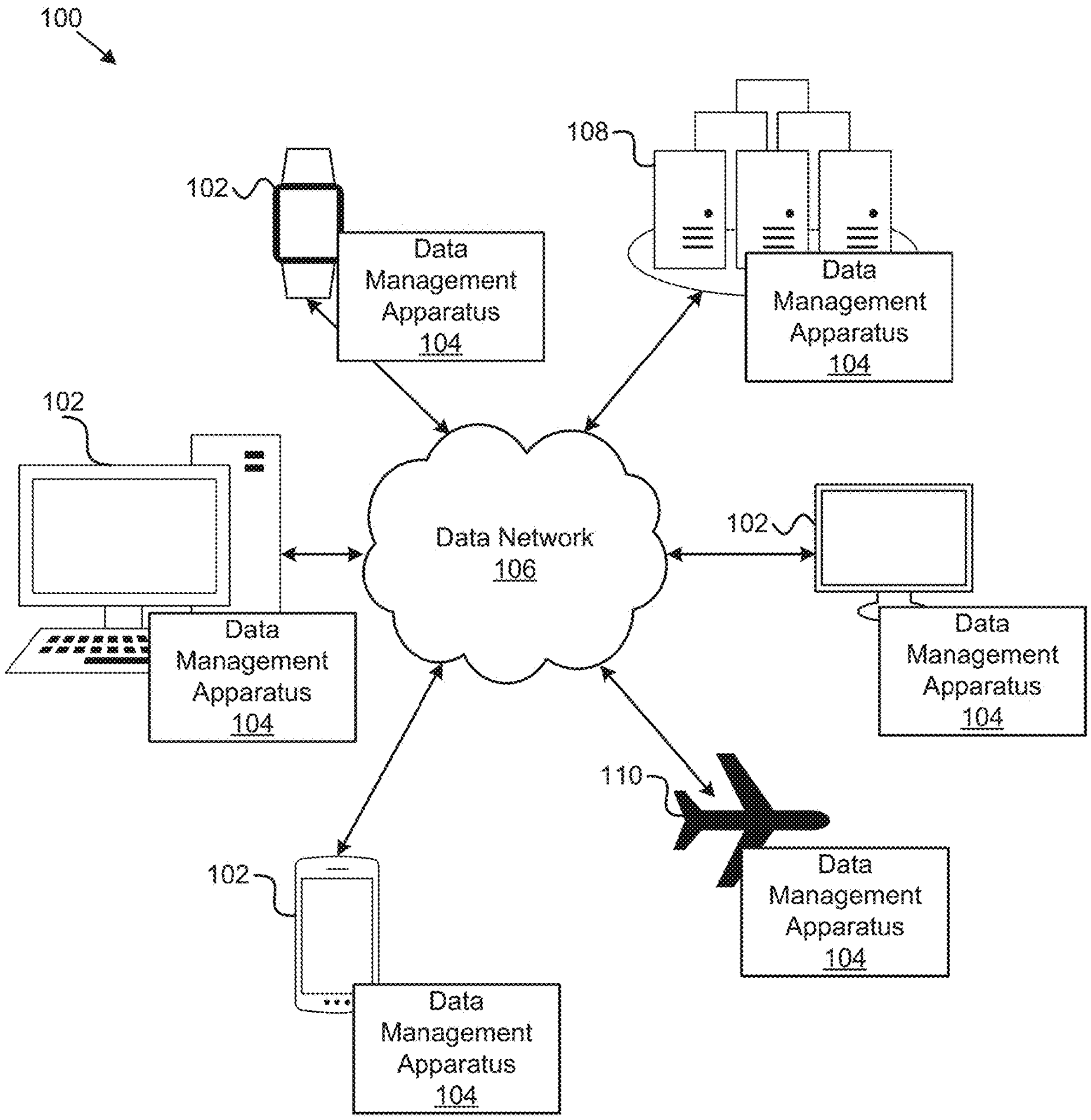
FIG. 1 is a schematic block diagram illustrating one embodiment of a system for dynamic selection of an aeronautical data provider.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a schematic block diagram illustrating one embodiment of a general information system 100 for dynamic selection of an aeronautical data provider. In one embodiment, the system 100 includes one or more information handling devices 102, one or more data management apparatuses 104, one or more data networks 106, one or more servers 108, and one or more aircraft 110. In certain embodiments, even though a specific number of information handling devices 102, data management apparatuses 104, data networks 106, and servers 108 are depicted in FIG. 1, one of skill in the art will recognize, in light of this disclosure, that any number of information handling devices 102, data management apparatuses 104, data networks 106, servers 108, and aircraft 110 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the data management apparatus 104 is configured to receive streams of real-time aeronautical data from different aeronautical data providers, provide the received data to a decision model to predict which of the streams of aeronautical data has a higher accuracy, and switches, during a flight, from one aeronautical data provider to another with the higher accuracy. The data management apparatus 104 is described in more detail below with reference to FIGS. 2 and 3.

In one embodiment, the data management apparatus 104 is part of a flight management system that may be located on board an aircraft 110, on a ground control system, and/or some combination of both. In certain embodiments, the data management apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the data management apparatus 104 may include a power interface, a wired and/or wireless network interface, a graphical interface that attaches to a display, and/or a semiconductor integrated circuit device as described below, configured to perform the functions described herein regarding the data management apparatus 104.

The data management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the data management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the data management apparatus 104.

The semiconductor integrated circuit device or other hardware appliance of the data management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the data management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to store content and to execute or run video/audio conferencing and/or other online presentation algorithms, programs, applications, processes, and/or the like. The one or more servers 108 may be part of a flight management system maintained by an aviation agency, e.g., the federal aviation administration, an airline, an airport, and/or the like.

The aircraft 110, in one embodiment, may include civil and military aircraft such as a private airplane, a commercial airplane, a cargo airplane, a jet, a helicopter, a drone, and/or the like. One of skill in the art, in light of this disclosure, will recognize the various types of aircraft that may be used with the solutions proposed herein.

Figure 2:
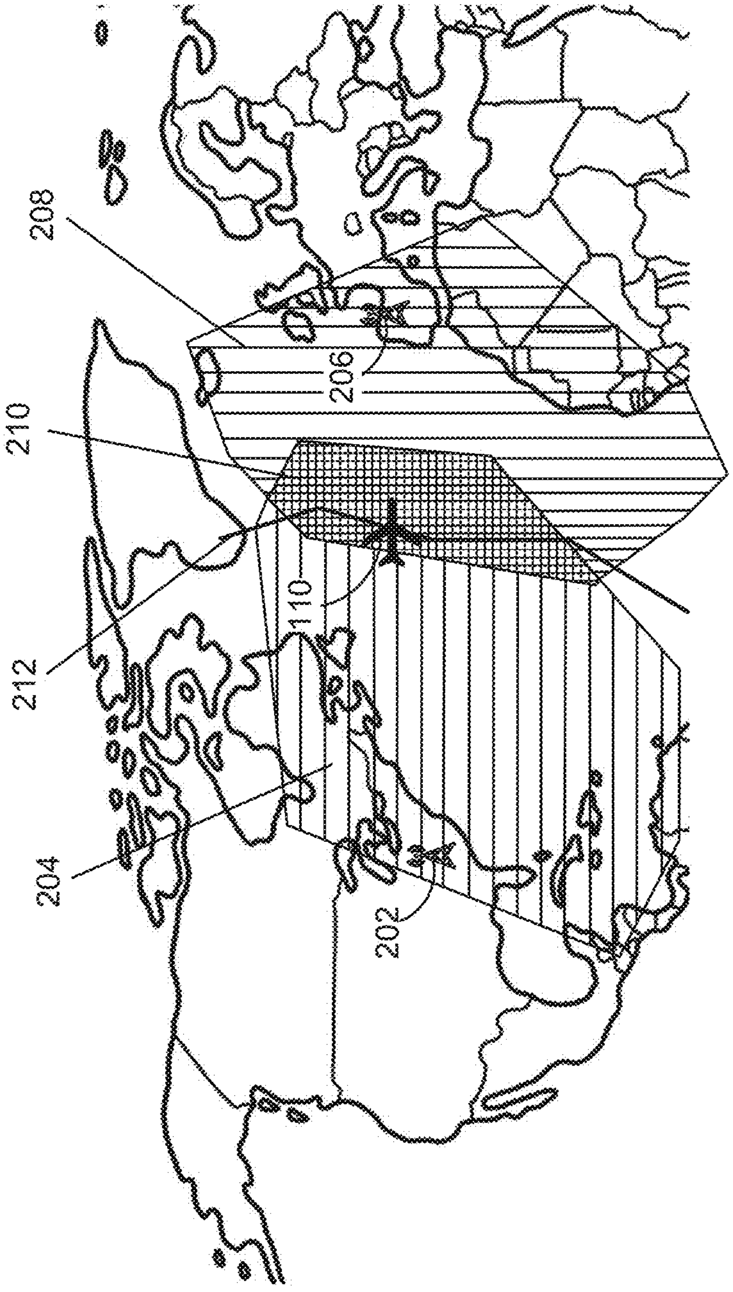
FIG. 2 depicts one example embodiment of a scenario for dynamic selection of an aeronautical data provider.

FIG. 2 depicts one example embodiment of a scenario that the subject matter herein proposes solutions for. In one embodiment, a first ground-based station 202 provides streaming, real-time aeronautical data to an aircraft 110 within a first predefined area 204. Similarly, a second ground-based station 206 may stream real-time aeronautical data to an aircraft 110 within a second predefined area 208. There may be numerous ground-based stations 202 located at various geographic locations. In one embodiment, the ground-based stations 202, 206 are owned, managed, maintained, or otherwise operated by an airline (e.g., Delta® airlines), an aircraft manufacturer (e.g., Boeing®), a government agency (e.g., the federal aviation administration's ("FAA") system wide information management ("SWIM"), Eurocontrol's network manager, or the like), and/or the like.

In one embodiment, the aeronautical data includes system-wide flight information that may have various formats, such as aeronautical information exchange model ("AIXM"), flight information exchange model ("FIXM"), weather information exchange model ("WXXM"). In one embodiment, the aeronautical data may include information that is useful for an aircraft 110, e.g., a flight control system, a pilot, or the like, during a flight. For example, the ground-based stations 202 may stream aeronautical data that includes surveillance data, actual or predicted times (e.g., time of arrival, time of departure, off-block time, taxi time, sector's crossing times, or the like), airspace configuration data, airspace congestion levels, routes availability, and/or the like.

In one embodiment, when sharing aeronautical information, the different providers (e.g., ground control stations 202, 206) offer data in their own structure, where the quality of the information and the geographical distribution varies from one to another. For instance, the concept of SWIM refers to a set of standards for infrastructure and governing protocols that allow Air Traffic Management ("ATM") providers and users to exchange ATM-related information. However, a SWIM environment only establishes a procedure to share information; it may not impose any requirement on the information quality. Subsequently, each provider offers different varieties of information with different levels of quality. The differences may be even more stark when it comes to predictions of certain events in the management of a flight since each provider might have its own methodology to generate the data. Another example can be found in automatic dependent surveillance-broadcast ("ADS-B") surveillance tracking providers, where the availability of information in a specific geographic area is determined by the number of receivers deployed.

In addition, these providers often provide model-based predictions that can vary substantially from one to another. Considering that most aeronautical information providers do not offer coverage for the entire airspace on Earth, the differences in the type and quality of information between different providers makes it difficult to integrate this information seamlessly into devices and applications.

As shown in FIG. 2, the broadcast or streaming areas 204, 208 of the different ground-based stations 202, 206, e.g., an FAA-managed station and a Eurocontrol-managed station, may overlap, creating an overlap area 210, where the aircraft 110 can receive streaming aeronautical data from both (or more) ground stations 202, 206 regardless of the aircraft's 110 actual position, time, heading, altitude, phase of flight, and/or the like for each distinct flight and flight route. In such an embodiment, aeronautical data received from a first ground station 202 may be more accurate that aeronautical data received from a second ground station 206. Accordingly, the subject matter herein describes solutions for determining a boundary, line, and/or other area 212 where a switch can be made from receiving and using aeronautical data from a first ground station 202, 206 to receiving and using aeronautical data from a second ground station 206, 202 during a flight.

In general, the subject matter disclosed herein relies on a hybrid machine learning algorithm that considers both historical and real-time information. In one embodiment, the algorithm establishes a data-driven decision based on the available historical information. Note that more than one data source may be available. Here, the algorithm solves a minimization problem where the target variable is selected based on the specific application.

For example, for the analysis between different ADS-B surveillance tracking providers, this decision is based on the latency of the messages, e.g., the amount of time required by the message to be sent, and the update frequency, e.g., the number of messages received in a certain amount of time. These metrics are closely related to the coverage of the sources.

When the algorithm is trained with historical data it is ready to be used. However, its accuracy can be increased by considering real-time information that can allow it to identify disruptions in a specific source due to an external issue, such as a power shortage that the rest of suppliers are not suffering. This real-time information, in one embodiment, is embedded in the algorithm as a safety net in the minimization problem, where their contribution to the overall accuracy of each metric is governed by the inclusion of a scaling parameter.

For example, this methodology can be applied to the estimated time of arrival ("ETA") messages provided by the FAA and Eurocontrol within their SWIM environments. These messages contain a prediction of the time of arrival for an airborne flight, and they are emitted during the entire flight. It may be observed that the amount of information available is significantly larger in the FAA SWIM source covering the departure area, and then there is a region in which the number of messages provided by the FAA SWIM source sharply decreases, which also coincides with the point where the EUROCONTROL provides more accurate or better-quality messages. Moreover, at the flight becomes closer to the actual arrival the distribution of data errors narrows, which implies a more accurate system. Other factors besides the time in advance that messages/data is received may be considered including geographic locations, altitude, weather, and/or the like.

Furthermore, the subject matter herein could be applied as a simple comparison tool between different sources to detect anomalies, issues, errors, or the like in the predictions. For instance, strange pattern behavior may be detected in which some error quantities never happen. This effect, for example, may be ascribed to the model EUROCONTROL is using to perform the predictions. Similar source validation could be applied to other type of information providers, such as ADS-B surveillance tracking providers. In this manner, better insights of the strengths and weaknesses of each provider may be determined, thus allowing to manage more efficiently the resources when deciding which provider to use.

Figure 3:
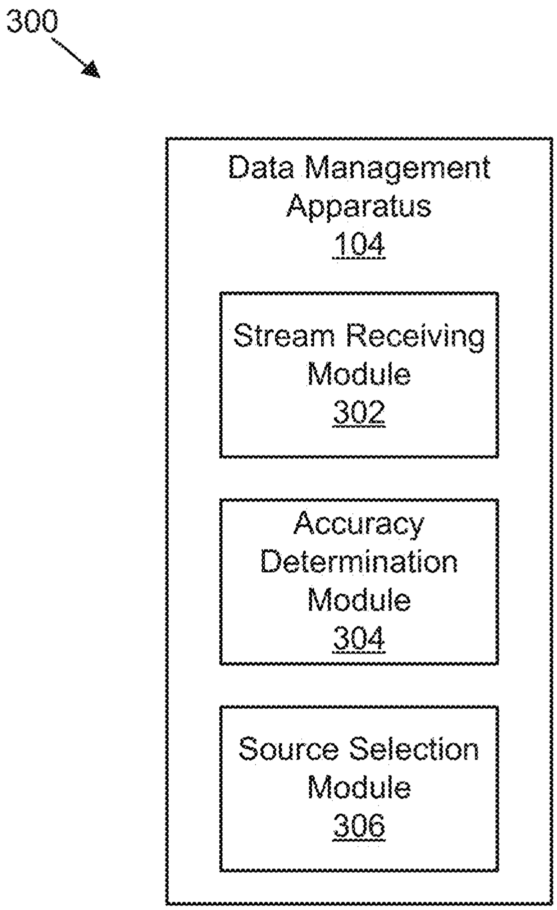
FIG. 3 depicts one embodiment of an apparatus for dynamic selection of an aeronautical data provider.

FIG. 3 depicts one embodiment of an apparatus 300 for dynamic selection of an aeronautical data provider. In one embodiment, the apparatus 300 includes an instance of a data management apparatus 104. The data management apparatus 104 may include embodiments of a stream receiving module 302, an accuracy determination module 304, and a source selection module 306, which are described in more detail below.

In one embodiment, the stream receiving module 302 is configured to receive a first stream of real-time aeronautical data from a first aeronautical data provider for use by a flight management system during a flight. In further embodiments, the stream receiving module 302 is configured to receive at least one second stream of real-time aeronautical data from at least one second aeronautical data provider simultaneously with the first stream of aeronautical data during the flight.

For instance, the stream receiving module 302 may be registered for, subscribed to, or otherwise authorized to receive the streaming aeronautical data, which may be received over a data network 106 such as over a cellular data network, a non-terrestrial (satellite) data network, and/or the like. In one embodiment, the stream receiving module 302 listens, polls, or otherwise detects when a stream of aeronautical data is available from a data provider (e.g., a ground-based station), and performs an authorization procedure with the data provider to receive the streaming aeronautical data.

For example, a stream receiving module 302 on a flight leaving the United States for Europe may receive real-time streaming aeronautical data, e.g., SWIM data, from a ground-based station operated by the FAA. As the flight gets closer to Europe, the stream receiving module 302 may detect streaming aeronautical data, e.g., SWIM data being broadcast from a ground-based station in Europe that is operated by Eurocontrol. In such an embodiment, the stream receiving module 302 authenticates with the Eurocontrol system and starts receiving the streaming aeronautical data from the Eurocontrol data provider. Similarly, other streaming data may also be received, if available, such that the stream receiving module 302 receives streaming aeronautical data from a plurality of data providers.

In one embodiment, the accuracy determination module 304 is configured to provide data from the first stream and the at least one second stream of real-time aeronautical data to a decision model for predicting which data of the first stream and the at least one second stream of real-time aeronautical data has a higher accuracy. The decision model may be a machine learning model, described in more detail below, that is trained using historical aeronautical data and/or other data such as surveillance data including multilateration data, radar data, internal reference system data, and/or the like.

The accuracy determination module 304, in one embodiment, inputs the aeronautical data received from the first data provider and the aeronautical data received from a second data provider (and so on) into the decision model, which analyzes both sets of data to determine an accuracy for each data set. The accuracy may be score, ranking, rating, estimation, prediction, forecast, and/or the like that can be used to compare against an accuracy determined for a different data set.

In one embodiment, the generated decision model is trained (described below) to solve a minimization problem for at least one target variable that is selected for a particular application. For example, for an analysis between different ADS-B surveillance data providers, the target variable may be a message latency, an update frequency, and/or the like. In such an example, the decision model may determine or predict which data stream has the lowest message latency for a period of time (e.g., the amount of time required to send/receive a message) or receives the most messages over a period of time (e.g., the number of messages received in a certain amount of time), and provides, calculates, or otherwise assigns an accuracy to each of the data streams (e.g., the latency, or range of latencies, may map to an accuracy score; the update frequency, or range of update frequencies may map to an accuracy score; and/or the like).

In one embodiment, when the decision model is trained with historical data, described below, it is ready to be used. However, its accuracy may be increased by considering real-time aeronautical data that can allow it to identify disruptions in a specific source/data provider due to an external issue, such as a power shortage, that other data providers may not be suffering. The real-time aeronautical data, in such an embodiment, is integrated or processed in the algorithm as a safety net in the minimization problem, where the contribution to the overall accuracy of each metric is governed by the inclusion of a scaling parameter.

In such an embodiment, the scaling parameter includes a weighting value that the decision model uses to determine the impact of the real-time aeronautical data on the accuracy prediction of the first stream and at least one second stream of real-time aeronautical data. The scaling parameter, for example, may be based on historical information collected from different data providers that indicates the likelihood that one data provider is better or more reliable than another data provider, which can be pre-calculated along the route of the aircraft. The scaling parameter may be used as input to the algorithm that decides when to switch provider. If a data provider is historically better in a geographic area, the decision model may take it into account when determining an accuracy of a data provider and, ultimately, whether to make a switch to a different data provider or not.

In one embodiment, the source selection module 306 is configured to switch, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data.

For instance, if the accuracy determination module 304 determines that aeronautical data from a first data provider, e.g., SWIM data from an FAA-operated data provider, has a lower accuracy score than aeronautical data form a second data provider, e.g., SWIM data from a Eurocontrol-operated data provider, during a flight, then the source selection module 306 may switch to using data form the second data provider instead of the first data provider.

In such an embodiment, the source selection module 306 may consider or determine a difference margin between the accuracies of the first and second data providers and determine if the margin satisfies a switching threshold. For example, if the switching threshold is five, and the difference between the accuracies of the first and second streams of aeronautical data is 3, then the source selection module 306 may not trigger a switch to a different data provider. In this manner, in areas where the accuracies of different streams of aeronautical data is similar, the source selection module 306 is not constantly switching between different data providers, which can conserve power, processing cycles, prevent data or switching conflicts, and/or the like.

In this manner, a flight control system, e.g., an on-board or other flight control system, may be provided with the most accurate, highest quality data from a streaming aeronautical data provider, for use by pilots during a flight (e.g., to make flight/route decisions/strategies); to present information to passengers (e.g., ETA information, route information, weather information at the destination, and/or the like); and/or the like. In one embodiment, when flights cross multiple regions, the information available for that flight might be partial, or might not be the same type, format, or quality across regions. This is, for example, problematic for BGS-DS&A/Jeppesen products that should work in any region and provide a standard set of functionalities for any client. Therefore, it is important to develop solutions that integrate aeronautical data from several data providers in a single service, providing the information with the highest possible quality regardless of the original source. As explained above, the subject matter herein proposes solutions for analyzing the best provider in terms of, for example, coverage and quality for certain aeronautical information types. Based on this analysis, switching logic is generated to select and use the aeronautical data from the best provider.

Figure 4:
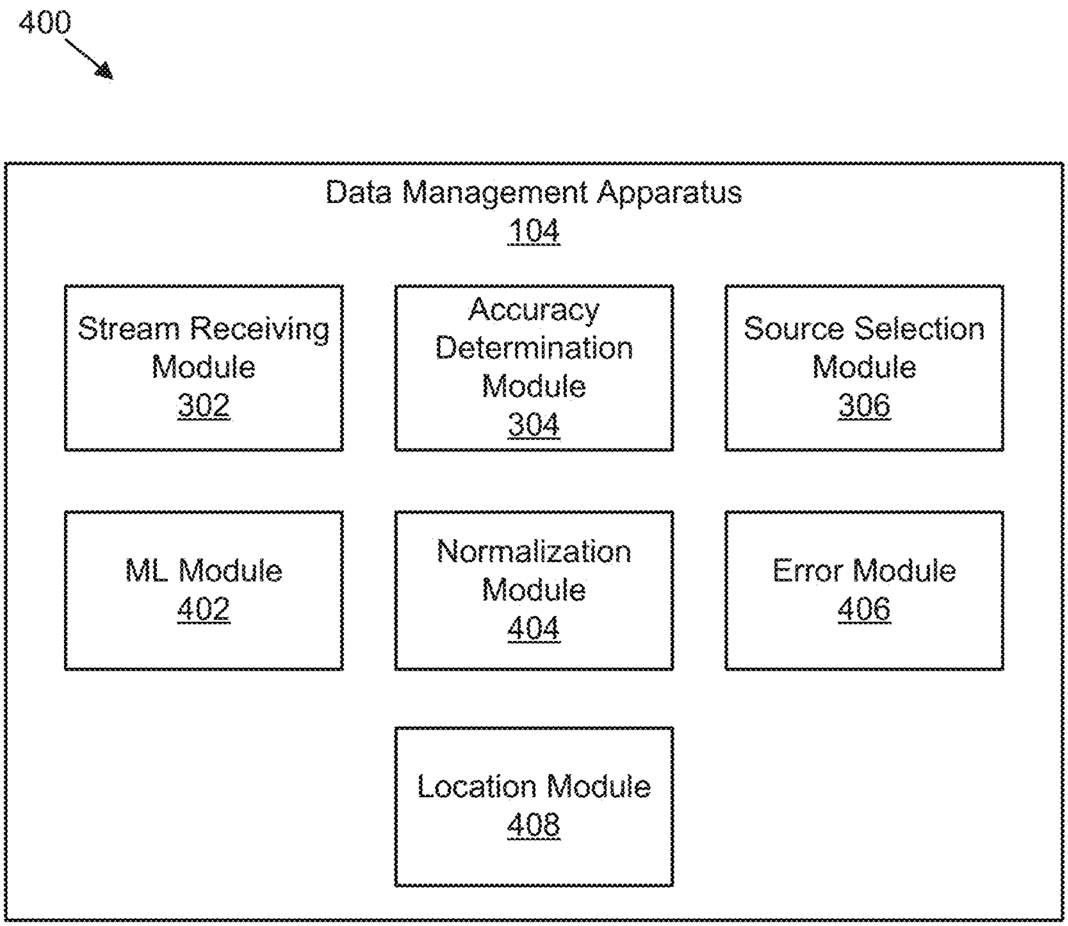
FIG. 4 depicts one embodiment of another apparatus for dynamic selection of an aeronautical data provider.

FIG. 4 depicts one embodiment of an apparatus 400 for dynamic selection of an aeronautical data provider. In one embodiment, the apparatus 400 includes an instance of a data management apparatus 104. The data management apparatus 104 may include embodiments of a stream receiving module 302, an accuracy determination module 304, and a source selection module 306, which may be substantially similar to the stream receiving module 302, the accuracy determination module 304, and the source selection module 306 described above with reference to FIG. 3. Furthermore, the data management apparatus 104 may include embodiments of an ML module 402, a normalization module 404, an error module 406, and a location module 408, which are described in more detail below.

In one embodiment, the ML module 402 is configured to generate the decision model based on the historical aeronautical data. As described above, the decision model is a machine learning model that is generated based on one or more machine learning algorithms, such as supervised learning algorithms (e.g., nearest neighbor, naïve bayes, decision trees, linear regression, support vector machines, neural networks, and/or the like), unsupervised learning algorithms (e.g., k-means clustering, association rules, and/or the like), semi-supervised learning algorithms, reinforcement learning algorithms (e.g., q-learning, temporal difference, deep adversarial networks, and/or the like), and/or the like. Machine learning, as used herein, refers to methods of data analysis that automates analytical model building. It is a branch of artificial intelligence based on the idea that systems can learn from data, identify patterns, and make decisions with minimal human intervention.

Thus, in one embodiment, the generated decision model comprises a machine learning model that is trained on the historical aeronautical data. Training the machine learning model may refer to providing an ML algorithm (that is, the learning algorithm) with training data to learn from. The term ML model may refer to the model artifact that is created by the training process. In one embodiment, the training data contains the correct answer, which is known as a target or target attribute. The learning algorithm finds patterns in the training data that map the input data attributes to the target (the answer that you want to predict), and it outputs an ML model that captures these patterns. You can use the ML model to get predictions on new data for which the target is not known, such as, an accuracy of a set of aeronautical data at a particular geographic location, altitude, heading, and/or the like.

In some embodiments, the ML module 402 trains the decision model on historical aeronautical data that is received along a particular flight path from different data providers. The ML module 402 may further train and refine the decision model using new streaming data as it is received. In this manner, the ML module 402 constantly refines the decision model during and/or after a flight so that the decision model is up to date.

In one embodiment, the normalization module 404 is configured to normalize each of the streams of aeronautical data from the plurality of aeronautical data providers prior to providing it to the decision model. Normalization may refer to modifying, adjusting, organizing, or the like data from different sources to appear similar across records, fields, values, and/or the like, so that the data may be treated the same.

For instance, each data provider may provide streaming aeronautical data in different formats, structures, and/or the like. To process the data, e.g., using the decision model, the normalization module 404 may convert each data value, record, field, or the like to a standard form, format, structure, or the like so that aeronautical data from different data providers can be treated or analyzed in the same manner.

In one embodiment, the error module 406 is configured to detect errors in the first stream and the at least one second stream of real-time aeronautical data based on a comparison of the accuracy predictions for the first stream and the at least one second stream of real-time aeronautical data. For instance, the decision model may be trained and used as a comparison tool for different sources, which allows, for example, anomalies to be detected for the predictions. In other words, streaming aeronautical data from a data provider may be verified using the decision model by comparing the real-time streaming data against the historical data to detect whether there are anomalies in the real-time streaming data. In one embodiment, this provides better insights into the strengths and weakness of each provider, which can be used as an additional factor when deciding which data provider to use.

In one embodiment, the location module 408 is configured to determine a geographic location of the flight where the switch from the using data from the first stream of real-time aeronautical data to data from one of the at least one second streams of real-time aeronautical data occurs. In one embodiment, the geographic location is another variable used by the decision model for predicting accuracies that are used to determine when to switch from the first stream of real-time aeronautical data to the at least one second streams of real-time aeronautical data.

For example, the location that the location module 408 determines may be input into the decision model as another factor to consider, e.g., historically which data provider has been used at this location. Other factors may also be considered such as altitude, weather, heading, wind speed, and/or the like.

Figure 5:
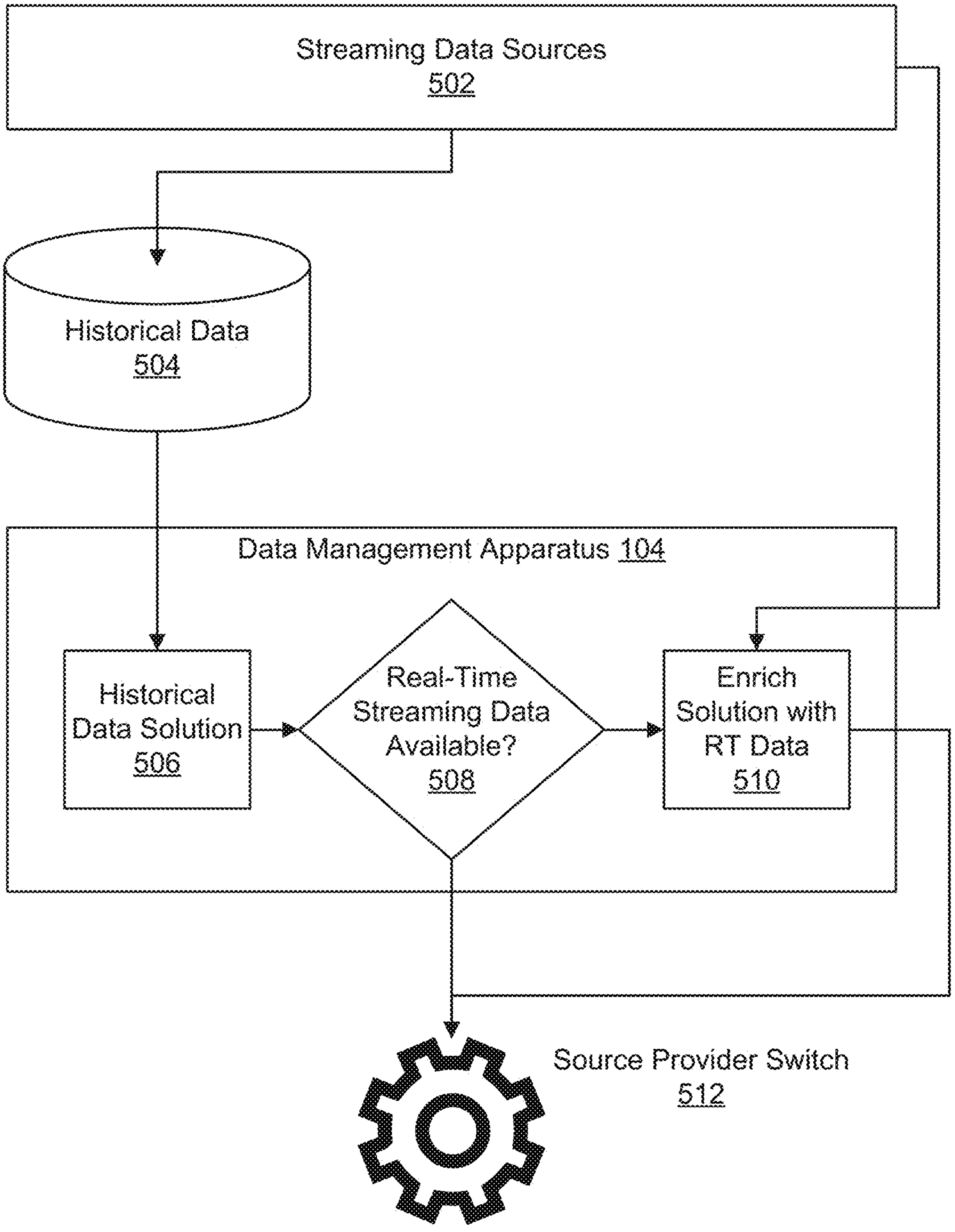
FIG. 5 depicts one embodiment of a system flow for dynamic selection of an aeronautical data provider.

FIG. 5 depicts one embodiment of a system flow 500 for dynamic selection of an aeronautical data provider. In one embodiment, a plurality of streaming data sources 502, e.g., ground-based data providers, may provide real-time aeronautical data. The real-time aeronautical data may be stored in a historical database 504 located, e.g., at a ground-based data provider, as part of an airline information system, on board an aircraft, and/or the like.

In one embodiment, the historical data 504 is provided to a data management apparatus 104 and used to train a machine learning model, e.g., a decision model, to generate a historical data-driven solution 506. For instance, during a flight, the decision model may be used to predict which data provider to use, from a plurality of data providers, based on the historical data and using various factors such as the geographic location, the altitude, the heading, and/or the like.

The data management apparatus 104 may determine whether real-time streaming aeronautical data is available 508, and, if so, may enhance or enrich 510 the historical data-driven solution with the real-time streaming aeronautical data, e.g., provide the real-time streaming aeronautical data to the decision model, to determine an accuracy of the data providers. The source selection module 306, based on the determined accuracies, may determine to switch 512 to using streaming data from a different data provider than the one that is currently being used.

Figure 6:
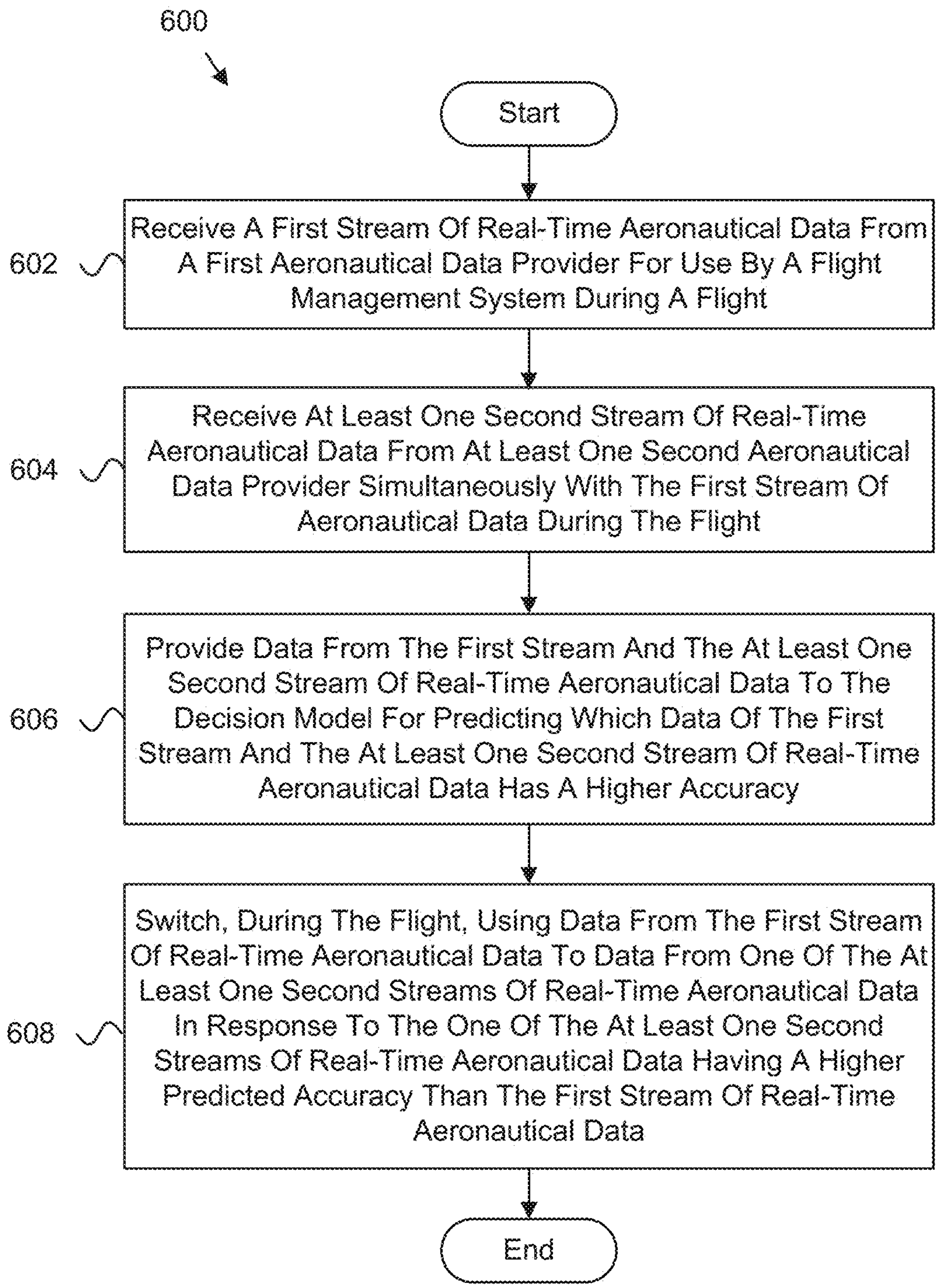
FIG. 6 is a schematic block diagram illustrating one embodiment of a method for dynamic selection of an aeronautical data provider.

FIG. 6 depicts one embodiment of a method 600 for dynamic selection of an aeronautical data provider. In one embodiment, the method 600 begins and receives 602 a first stream of real-time aeronautical data from a first aeronautical data provider for use by a flight management system during a flight.

In one embodiment, the method 600 receives 604 at least one second stream of real-time aeronautical data from at least one second aeronautical data provider simultaneously with the first stream of aeronautical data during the flight.

In one embodiment, the method 600 provides data from the first stream and the at least one second stream of real-time aeronautical data to a decision model for predicting which data of the first stream and the at least one second stream of real-time aeronautical data has a higher accuracy.

In one embodiment, the method 600 switches, during the flight, using data from the first stream of real-time aeronautical data to data from one of the at least one second streams of real-time aeronautical data in response to the one of the at least one second streams of real-time aeronautical data having a higher predicted accuracy than the first stream of real-time aeronautical data, and the method 600 ends. In one embodiment, the stream receiving module 302, the accuracy determination module 304, and the source selection module 306 perform the different steps of the method 600.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

a processor; and a memory that stores code executable by the processor to:

receive a first stream of real-time aeronautical data from a first aeronautical data provider for use by a flight management system during a flight;

receive at least one second stream of real-time aeronautical data from at least one second aeronautical data provider simultaneously with the first stream of aeronautical data during the flight;

generate a decision model based on historical aeronautical data, wherein:

the historical aeronautical data comprises first information received from the first aeronautical data provider and second information received from the at least one second aeronautical data provider, the first information and the second information being of a same information type; and the decision model comprises a machine learning model that is trained on the historical aeronautical data and trained to solve a minimization problem for at least one target variable that is selected for a particular application, and wherein the target variable comprises one or more of a message latency and an update frequency, wherein the message latency comprises an amount of time required to at least one of send a message to or receive a message from at least one of the first aeronautical data provider or the second aeronautical data provider;

provide data from the first stream and the at least one second stream of real-time aeronautical data to the decision model for predicting which data of the first stream and the at least one second stream of real-time aeronautical data has a higher accuracy; and switch, during the flight, from using data from the first stream of real-time aeronautical data to data from one of the at least one second streams of real-time aeronautical data in response to the one of the at least one second streams of real-time aeronautical data having a higher predicted accuracy than the first stream of real-time aeronautical data.

2. The apparatus of claim 1, wherein the code is executable by the processor to further train the decision model using the received first stream of real-time aeronautical data and the at least one second stream of real-time aeronautical data.

3. The apparatus of claim 2, wherein the code is executable by the processor to associate a scaling parameter with the first stream and at least one second stream of real-time aeronautical data, the scaling parameter comprising a weighting value, and wherein the decision model uses the weighting value to determine an impact of the real-time aeronautical data on the accuracy prediction of the first stream of real-time aeronautical data and the at least one second stream of real-time aeronautical data.

4. The apparatus of claim 1, wherein the code is executable by the processor to normalize each of the streams of aeronautical data from the first aeronautical data provider and the at least one second aeronautical data provider prior to providing it to the decision model.

5. The apparatus of claim 1, wherein the code is executable by the processor to detect errors in the first stream and the at least one second stream of real-time aeronautical data based on a comparison of the accuracy predictions for the first stream and the at least one second stream of real-time aeronautical data.

6. The apparatus of claim 1, wherein the code is executable by the processor to determine a geographic location of the flight where the switch from the using data from the first stream of real-time aeronautical data to data from one of the at least one second streams of real-time aeronautical data occurs, the geographic location comprising another variable used by the decision model for predicting when to switch from the first stream of real-time aeronautical data to the at least one second streams of real-time aeronautical data.

7. The apparatus of claim 1, wherein the first and second aeronautical data providers comprise ground-based stations that provide streams of aeronautical data for a plurality of flights, the received streams comprising streams of overlapping aeronautical data from different ground-based stations.

8. The apparatus of claim 1, wherein the information type comprises at least one of: air traffic surveillance data, historical and/or predicted timing of an action by an aircraft, airspace data for an overlapping streaming area of a first streaming area of the first aeronautical data provider and a second streaming area of the at least one second aeronautical data provider, route availability for an aircraft within the overlapping streaming area, or any combination thereof.

9. The apparatus of claim 1, wherein the code is further executable to detect, during the flight and while an aircraft of the flight is within a streaming area of the first aeronautical data provider, the at least one second stream of real-time aeronautical data from the at least one second aeronautical data provider.

10. The apparatus of claim 9, wherein the code is further executable to perform, in response to the detecting, an authentication procedure with the at least one second aeronautical data provider over a data network and to receive the at least one second stream of real-time aeronautical data in response to the authentication procedure.

11. The apparatus of claim 9, wherein the code is further executable by the processor to:

associate a scaling parameter with the first stream of aeronautical data, the scaling parameter comprising a weighting value and indicating a likelihood that the first stream is more accurate than the second stream, the likelihood based at least in part on the historical aeronautical data; and receive, from the decision model, a predicted accuracy of at least one of the first data stream and the second data stream, wherein the predicted accuracy is based at least in part on the scaling parameter.

12. A method, comprising:

receiving a first stream of real-time aeronautical data from a first aeronautical data provider for use by a flight management system during a flight;

receiving at least one second stream of real-time aeronautical data from at least one second aeronautical data provider simultaneously with the first stream of aeronautical data during the flight;

generating a decision model based on historical aeronautical data, wherein:

the historical aeronautical data comprises first information received from the first aeronautical data provider and second information received from the at least one second aeronautical data provider, the first information and the second information being of a same information type; and the decision model comprises a machine learning model that is trained on the historical aeronautical data and trained to solve a minimization problem for at least one target variable that is selected for a particular application wherein the at least one target variable comprises one or more of a message latency and an update frequency, wherein the message latency comprises an amount of time required to at least one of send a message to or receive a message from at least one of the first aeronautical data provider or the second aeronautical data provider;

providing data from the first stream and the at least one second stream of real-time aeronautical data to the decision model for predicting which data of the first stream and the at least one second stream of real-time aeronautical data has a higher accuracy; and switching, during the flight, from using data from the first stream of real-time aeronautical data to data from one of the at least one second streams of real-time aeronautical data in response to the one of the at least one second streams of real-time aeronautical data having a higher predicted accuracy than the first stream of real-time aeronautical data.

13. The method of claim 12, further comprising further training the decision model using the received first stream of real-time aeronautical data and the at least one second stream of real-time aeronautical data.

14. The method of claim 12, the decision model uses a weighting value to determine an impact of the real-time aeronautical data on the accuracy prediction of the first stream of real-time aeronautical data and the at least one second stream of real-time aeronautical data.

15. The method of claim 12, further comprising normalizing each of the streams of aeronautical data from the first aeronautical data provider and the at least one second aeronautical data provider prior to providing it to the decision model.

16. The method of claim 12, further comprising detecting errors in the first stream and the at least one second stream of real-time aeronautical data based on a comparison of the accuracy predictions between the first stream and the at least one second stream of real-time aeronautical data.

17. The method of claim 12, further comprising determining a geographic location of the flight where the switch from the using data from the first stream of real-time aeronautical data to data from one of the at least one second streams of real-time aeronautical data occurs, the geographic location comprising another variable used by the decision model for predicting when to switch from the first stream of real-time aeronautical data to the at least one second streams of real-time aeronautical data.

18. The method of claim 12, further comprising:

detecting, during the flight and while an aircraft of the flight is within a streaming area of the first aeronautical data provider, the at least one second stream of real-time aeronautical data from the at least one second aeronautical data provider;

associating a scaling parameter with the first stream of aeronautical data, the scaling parameter comprising a weighting value and indicating a likelihood that the first stream is more accurate than the second stream, the likelihood based at least in part on the historical aeronautical data; and receiving, from the decision model, a predicted accuracy of at least one of the first stream and the second stream, wherein the predicted accuracy is based at least in part on the scaling parameter.

19. A system, comprising:

a plurality of ground-based stations each streaming aeronautical data from different geographic locations; and a flight management system comprising a processor and a memory that stores code executable by the processor to:

receive a first stream of real-time aeronautical data from a first aeronautical data provider for use by the flight management system during a flight;

receive at least one second stream of real-time aeronautical data from at least one second aeronautical data provider simultaneously with the first stream of aeronautical data during the flight;

generate a decision model based on historical aeronautical data, wherein:

the historical aeronautical data comprises first information received from the first aeronautical data provider and second information received from the at least one second aeronautical data provider, the first information and the second information being of a same information type; and the decision model comprises a machine learning model that is trained on the historical aeronautical data and trained to solve a minimization problem for at least one target variable that is selected for a particular application wherein the at least one target variable comprises one or more of a message latency and an update frequency, wherein the message latency comprises an amount of time required to at least one of send a message to or receive a message from at least one of the first aeronautical data provider or the second aeronautical data provider;

provide data from the first stream and the at least one second stream of real-time aeronautical data to the decision model for predicting which data of the first stream and the at least one second stream of real-time aeronautical data has a higher accuracy; and switch, during the flight, from using data from the first stream of real-time aeronautical data to data from one of the at least one second streams of real-time aeronautical data in response to the one of the at least one second streams of real-time aeronautical data having a higher predicted accuracy than the first stream of real-time aeronautical data.

20. The system of claim 19, wherein the code is further executable by the processor to:

detect, during the flight and while an aircraft of the flight is within a streaming area of the first aeronautical data provider, the at least one second stream of real-time aeronautical data from the at least one second aeronautical data provider;

associate a scaling parameter with the first stream of aeronautical data, the scaling parameter comprising a weighting value and indicating a likelihood that the first stream is more accurate than the second data stream, the likelihood based at least in part on the historical aeronautical data; and receive, from the decision model, a predicted accuracy of at least one of the first stream and the second data stream, wherein the predicted accuracy is based at least in part on the scaling parameter.

* * * * *